US012686277B2

(12) United States Patent
Katayama et al.

(10) Patent No.: US 12,686,277 B2
(45) Date of Patent: Jul. 21, 2026

(54) INDEPENDENT RIGHT-LEFT WHEEL DRIVING VEHICLE

(71) Applicant: TOYOTA JIDOSHA KABUSHIKI KAISHA, Toyota (JP)

(72) Inventors: Koichi Katayama, Okazaki (JP); Koichi Okuda, Toyota (JP); Atsushi Tabata, Okazaki (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 0 days.

(21) Appl. No.: 18/944,534

(22) Filed: Nov. 12, 2024

(65) Prior Publication Data

US 2025/0170896 A1 May 29, 2025

(30) Foreign Application Priority Data

Nov. 27, 2023 (JP) ................................. 2023-200202

(51) Int. Cl.
B60L 3/00 (2019.01)
B60L 15/20 (2006.01)

(52) U.S. Cl.
CPC ......... B60L 3/0061 (2013.01); B60L 15/2036 (2013.01); B60L 2240/24 (2013.01); B60L 2240/423 (2013.01); B60L 2240/425 (2013.01)

(58) Field of Classification Search
CPC .............. B60L 3/0061; B60L 15/2036; B60L 2240/24; B60L 2240/423; B60L 2240/425; B60L 2220/42; B60L 2240/36; B60L 2240/525; B60L 2260/28; B60L 15/20; B60L 15/32; B60L 2240/42; B60K 1/02
See application file for complete search history.

(56) References Cited

U.S. PATENT DOCUMENTS

| | | | |
|---|---|---|---|
| 6,549,840 B1 | 4/2003 | Mikami | |
| 2021/0370781 A1* | 12/2021 | Park | B60L 58/12 |
| 2023/0286393 A1* | 9/2023 | Takebayashi et al. | B60L 15/20 |

FOREIGN PATENT DOCUMENTS

| | | | | |
|---|---|---|---|---|
| DE | 10 2020 216373 | * | 6/2022 | B60L 3/0061 |
| JP | 2001-112114 A | | 4/2001 | |
| JP | 2005-204436 A | | 7/2005 | |
| JP | 2018-088768 A | | 6/2018 | |

* cited by examiner

*Primary Examiner* — Brodie J Follman
(74) *Attorney, Agent, or Firm* — SoraIP, Inc.

(57) ABSTRACT

A temperature detecting unit for detecting the temperature of the left electric motor and the temperature of the right electric motor, a temperature determination unit for determining that the temperature of one of the detected temperatures is outside the predetermined temperature range, a driving force limiting unit for reducing driving torque of the other electric motor that is not outside the temperature range when it is determined that one of the temperature of the left electric motor and the temperature of the right electric motor is outside the temperature range, and a driving torque increasing unit for increasing driving torque by the other driving device that does not include the one electric motor that is outside the temperature range among the first driving device and the second driving device when driving torque of the other electric motor is reduced.

10 Claims, 6 Drawing Sheets

INDEPENDENT RIGHT-LEFT WHEEL DRIVING VEHICLE

CROSS-REFERENCE TO RELATED APPLICATION

This application claims priority to Japanese Patent Application No. 2023-200202 filed on Nov. 27, 2023, incorporated herein by reference in its entirety.

BACKGROUND

1. Technical Field

The disclosure relates to a vehicle configured to drive right and left wheels independently of each other, and more particularly, relates to a vehicle in which an electric motor is provided for each of the right and left wheels.

2. Description of Related Art

In order to improve driving performance and traveling stability of the vehicle, driving force (driving torque) generated in each wheel is preferably individually controlled. A vehicle described in Japanese Unexamined Patent Application Publication No. 2001-112114 (JP 2001-112114 A), for example, is provided with an engine and a first electric motor as driving force sources for front wheels, and transmits driving torque output from these driving force sources to right and left front wheels in a state in which operational difference thereof is tolerated, via a differential mechanism (differential), while a second electric motor is provided as a driving force source for rear wheels, and is configured to transmit driving torque output from the second electric motor to the right and left rear wheels via a differential. In the vehicle described in this JP 2001-112114 A, for example, making a thermal rating of the first electric motor to be higher than a thermal rating of the second electric motor enables traveling stability to be maintained, even when operation of either of the electric motors is restricted.

SUMMARY

Electric motors used as driving force sources of vehicles inevitably generate heat by being operated, and when temperature thereof reaches an upper limit, torque that can be output is restricted, and normal operations are restricted, as well as durability deteriorating, and so forth. In the vehicle described in JP 2001-112114 A, the thermal ratings of the front and rear electric motors used as driving force sources are set so as to have a particular relation, and accordingly even when the operation of one of the front and rear electric motors is restricted, the operation of the other electric motor can be secured to maintain traveling stability.

However, vehicles perform various types of traveling, such as accelerating, decelerating, turning, climbing, descending, and so forth, and a load applied to each wheel or driving torque required for each wheel is different each time, and accordingly, in order to maintain the traveling stability or power performance in any of such various traveling states, preferably, all wheels (for example, the four wheels of the front and rear wheels), or at least one pair of right and left wheels, are driven by individual electric motors provided corresponding to each wheel. In the vehicle described in JP 2001-112114 A, even though balance of power distribution among the front and rear wheels can be maintained, individually controlling the driving torque of the right and left wheels independently of each other is difficult. Note that in the vehicle described in JP 2001-112114 A, the driving torque of the right and left wheels can be controlled to some extent, by implementing a configuration in which differential restriction of the front and rear differentials is appropriately performed. However, a differential restricting mechanism and a control device thereof need to be newly provided to this end, giving rise to other problems, such as increase in size, weight, and so forth, of the vehicle. Also, while it is possible to provide a cooling device having a sufficient capacity or size in order to circumvent restriction of operation due to the heat of the electric motor, this similarly gives rise to other problems, such as increase in the size, weight, and so forth, of the vehicle.

On the other hand, conventionally, there is known a vehicle, such as an in-wheel motor vehicle, configured such that motors are provided corresponding to all wheels, and all wheels are individually driven by these motors. Even in this type of vehicle, there may be restrictions on operations due to heat of the motors, and increasing capacity of a cooling device to reduce restrictions on the operations due to the heat also gives rise to the above-described problems, such as increase in the size of the device and so forth. Further, even in such a vehicle configured to drive all the wheels individually, it is conceivable that driving force balance between the right and left wheels will be impaired due to thermal characteristics of the motors and so forth, but conventionally, no attention has been paid in particular to such problems, and no suitable countermeasure means or devices to deal with such cases have been proposed.

The disclosure has been made in view of the above circumstances, and an object thereof is to provide a vehicle capable of maintaining necessary and sufficient driving performance even when restriction in driving occurs in either one of the right and left wheels, without inviting increase in size of a cooling device or the like.

In order to achieve the above object, the disclosure is an independent right-left wheel driving vehicle including a first driving device for driving right and left front wheels, and a second driving device for driving right and left rear wheels, in which at least one of the driving devices of the first driving device and the second driving device includes a left electric motor that drives a left wheel and a right electric motor that drives a right wheel making up a pair with the left wheel, the independent right-left wheel driving vehicle including a controller for controlling the first driving device and the second driving device, in which the controller includes a temperature detecting unit for detecting temperature of the left electric motor and temperature of the right electric motor, a temperature determination unit for determining that either one of the temperatures detected by the temperature detecting units is outside a temperature range that is set in advance, a driving force limiting unit for, when determination is made by the temperature determination unit that temperature of either one of the electric motors of the left electric motor and the right electric motor is outside the temperature range, reducing driving torque of the other electric motor having temperature not outside the temperature range, and a driving torque increasing unit for, when driving torque of the other electric motor is reduced by the driving force limiting unit, increasing driving torque by the other driving device that does not include the one electric motor having the temperature outside the temperature range, from among the first driving device and the second driving device.

In the disclosure, the other driving device out of the first driving device and the second driving device may include a traction electric motor as a driving force source, the temperature detecting unit may further include a function of detecting temperature of the traction electric motor, and the controller may further include a steady-state determination unit for determining that the temperature of the traction electric motor is within a steady-state range that is set in advance, and a driving torque increase forbidding unit for forbidding increase in driving torque by the driving torque increasing unit when the temperature of the traction electric motor is not within the steady-state range.

In the disclosure, the controller may further includes a four-wheel drive determination unit for determining four-wheel drive traveling in which in which the first driving device and the second driving device output drive torque to perform traveling, the driving force limiting unit may be configured to reduce driving torque of the other electric motor when the four-wheel drive traveling is determined to be performed, and also the driving torque increasing unit may be configured to increase driving torque of the other driving device when the four-wheel drive traveling is determined to be performed.

In the disclosure, the controller may further include a turning detecting unit for detecting that the vehicle is performing turning traveling, and a driving restriction forbidding unit for forbidding reduction of driving torque at the other electric motor by the driving force limiting unit when the vehicle is detected to be performing turning traveling.

In the disclosure, the temperature range may be one of a range in which only an upper limit temperature is set, and a range that is determined by the upper limit temperature and a lower limit temperature.

According to the disclosure, in the first driving device for driving the front wheels or the second driving device for driving the rear wheels, when the temperature of either one of the right and left electric motors is excessively high or excessively low, driving torque of the other electric motor is reduced. Accordingly, driving torque of the other electric motor is reduced in accordance with the one of the electric motors of which driving torque is restricted due to temperature conditions, and thus imbalance of torque between the right and left wheels can be avoided or suppressed. In addition, driving torque of the other driving device is increased, and accordingly driving torque reduced due to temperature conditions is compensated for by the increase of driving torque at the other driving device, such that driving torque of the vehicle as a whole can be maintained, and deterioration of power performance and traveling stability can be avoided or suppressed. Also, when the temperature of any one of the electric motors increases, the electric motor is not further actively cooled in order to maintain driving torque of the vehicle as a whole, and accordingly there is no need to increase size or capacity of the cooling device, and increase in the size, weight, or the like of the driving devices or the vehicle can be circumvented.

Also, according to the disclosure, when the temperature of the other driving device is not within the steady-state range, drive torque of the other driving device is not increased, and accordingly damage, deterioration in durability, and so forth, of the other driving device, can be prevented or suppressed.

According to the disclosure, only when in a four-wheel drive state is the control of reducing driving torque of the other electric motor or increasing driving torque of the other driving device executed, and accordingly change in drive torque handled by the wheels is smaller than that in a two-wheel drive state, whereby unnatural sensations, change in ride comfort, or the like, due to shock or the like, can be avoided or suppressed.

Further, according to the disclosure, when the vehicle performs turning traveling, the control of reducing driving torque of the other electric motor or increasing driving torque of the other driving device is forbidden, and thus unstable turning traveling and complication of control can be avoided or suppressed.

BRIEF DESCRIPTION OF THE DRAWINGS

Features, advantages, and technical and industrial significance of exemplary embodiments of the disclosure will be described below with reference to the accompanying drawings, in which like signs denote like elements, and wherein.

DETAILED DESCRIPTION OF EMBODIMENTS

Embodiments of the present disclosure will now be described with reference to the accompanying drawings. Note that the embodiments described below are merely examples of the implementation of the present disclosure, and do not limit the present disclosure.

The vehicle of the present disclosure is a total four-wheeled vehicle of two wheels on the front side and two wheels on the rear side, wherein a driving device is provided on each of the two wheels on the front side and the two wheels on the rear side, and each of the two wheels on the front side and the two wheels on the rear side can be driven independently of each other. In addition, an electric motor (motor or motor generator) as a power source corresponds to each of the left front wheel and the right front wheel, or the left rear wheel and the right rear wheel, which are paired with each other. Hereinafter, it will be described as a motor. The present disclosure relates to a vehicle capable of independently driving a left wheel and a right wheel. Note that the wheels on which the motors are individually provided may be only the front wheels or only the rear wheels. In this case, the left and right wheels, in which the motors are not separately provided, may be connected to a single electric motor via a differential gear.

Figure 1:
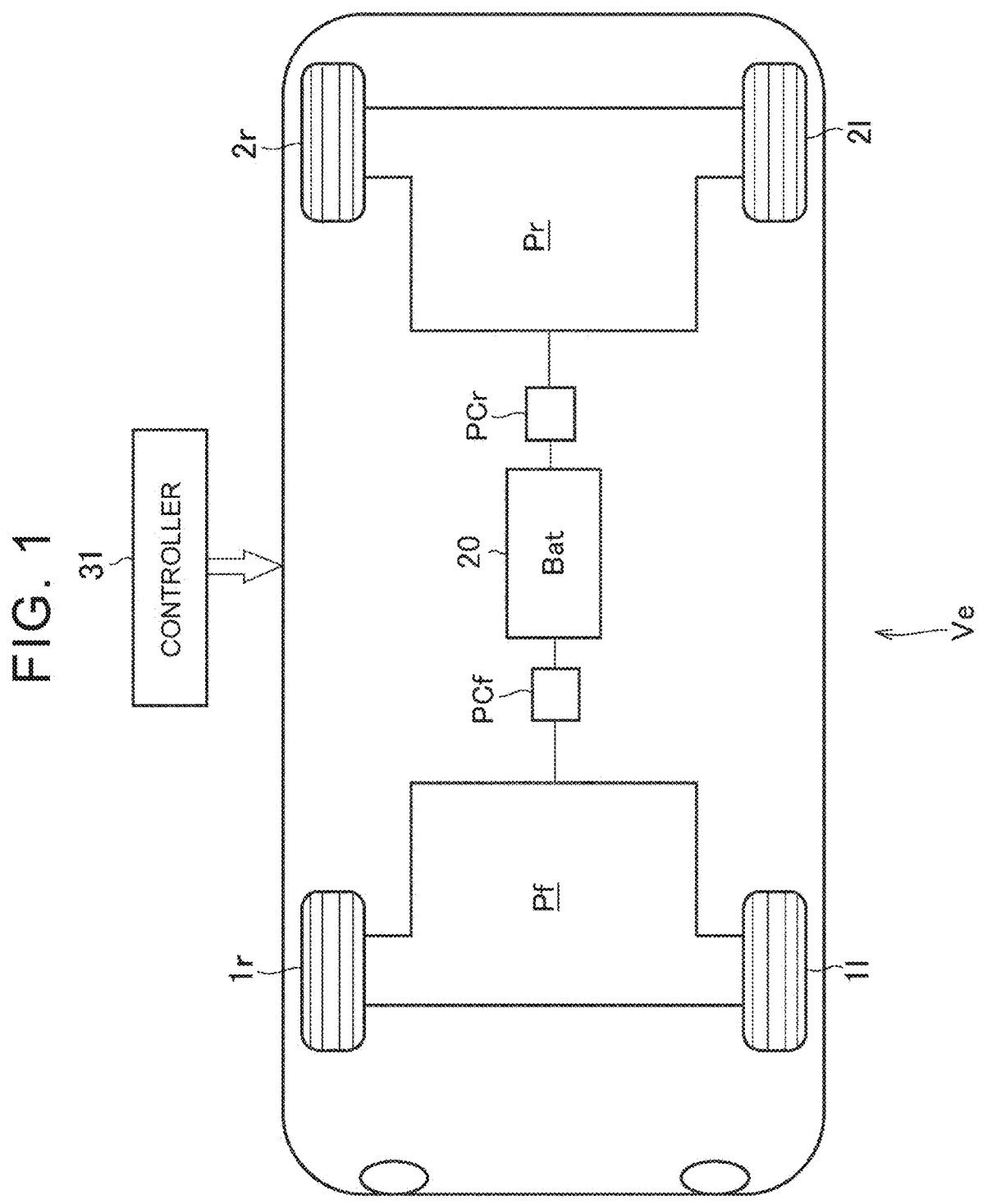
FIG. 1 is a block diagram schematically showing a drive system of a four-wheel independent drive vehicle as an example of a vehicle according to an embodiment of the present disclosure.

FIG. 1 schematically illustrates an example of an independent right-left wheel driving vehicle configured to be able to drive all four wheels independently of each other in addition to being able to control the drive torque or the regenerative braking torque between the front wheel and the rear wheel independently of each other. The vehicle Ve shown here includes right and left front wheels 1r, 1l and right and left rear wheels 2r, 2l, and driving devices (drive unit) Pf, Pr serving as drive force sources and provided corresponding to each of the front wheels 1r, 1l and the rear wheels 2r, 2l. Each of the driving devices Pf, Pr is mainly constituted by a motor and a gear reduction mechanism (transmission mechanism).

Figure 2:
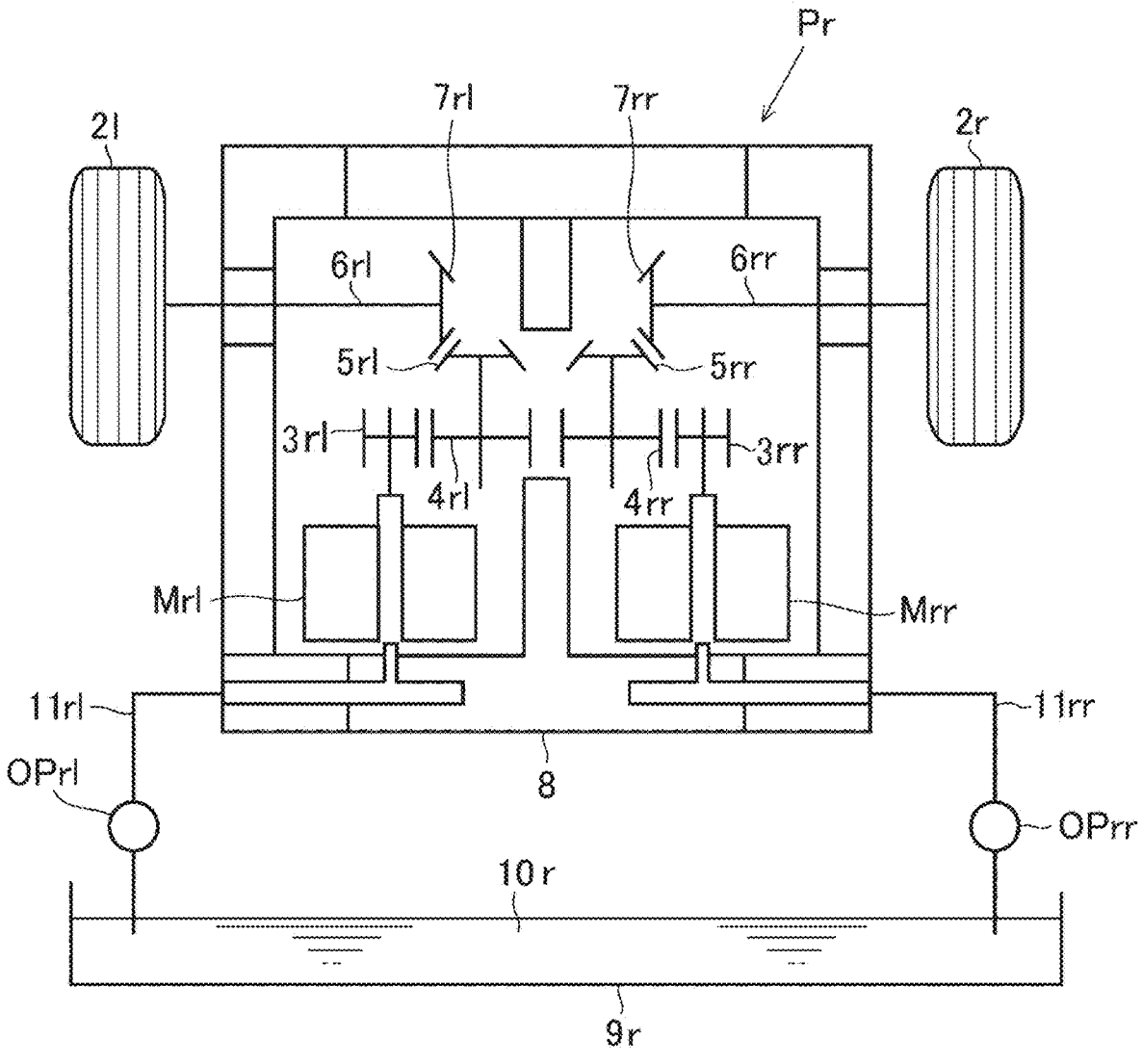
FIG. 2 is a skeleton diagram illustrating an example of a drive unit on a rear wheel side.

FIG. 2 is a skeleton diagram illustrating an exemplary driving device Pr on the rear wheels 2r, 2l. This driving device Pr is constituted by a pair of drive systems that control the right and left rear wheels 2r, 2l independently of each other, and these drive systems are symmetrical in configuration, and therefore will be described collectively without being limited to "right" or "left". In the following description, when the suffix of the reference numerals is one character, "f" is for the front wheel, "l" is for the left wheel, "r" is for the right wheel or for the rear wheel, and when it is two characters, "f" of the first character is for the front wheel, "r" is for the rear wheel, "r" of the second character is for the right wheel, and "l" is for the left wheel.

In the driving device Pr of the rear wheels 2r, 2l, motors Mrr, Mrl for traveling are mounted with their rotational center axes toward the front-rear direction of the vehicle Ve, drive gears 3rr, 3rl are attached to the rotor axes, and the drive gears 3rr, 3rl mesh with the counter driven gears 4rr, 4rl. The counter driven gears 4rr, 4rl are larger in diameter than the drive gears 3rr, 3rl, and therefore these gear pairs each constitute a reduction gear. Counter drive gears 5rr, 5rl which are each a bevel gear are provided so as to integrally rotate on the same axis as the counter driven gears 4rr, 4rl, and the counter drive gears 5rr, 5rl mesh with driven gears 7rr, 7rl which are each a bevel gear are integrated with drive shafts 6rr, 6rl connected to a rear wheels 2r, 2l. By making the driven gears 7rr, 7rl larger in diameter than the counter drive gears 5rr, 5rl, the gear pairs can be each a reduction gear.

The motors Mrr, Mrl, the reduction gears, and the bevel gears are accommodated in the casing 8 in a liquid-tight manner. Electric oil pumps OPrr, OPrl for supplying oil for cooling/lubricating to the motors Mrr, Mrl inside the casing 8 are provided. The oil pumps on the rear wheels 2r, 2l may be a single oil pump that collectively supplies oil 10r to the right and left motors Mrr, Mrl. These oil pumps OPrr, OPrl are provided outside the casing 8 at appropriate positions on Ve of the vehicle, and are configured to draw up oil 10r from the oil reservoir 9r and supply oil 10r to the motors Mrr, Mrl via a cooling oil passages 11rr, 11rl provided through the casing 8. Although not particularly illustrated, the oil 10r is recirculated from the inside of the casing 8 to the oil reservoir 9r. In addition, an oil cooler may be provided in the middle of the cooling oil passages 11rr, 11rl.

Figure 3:
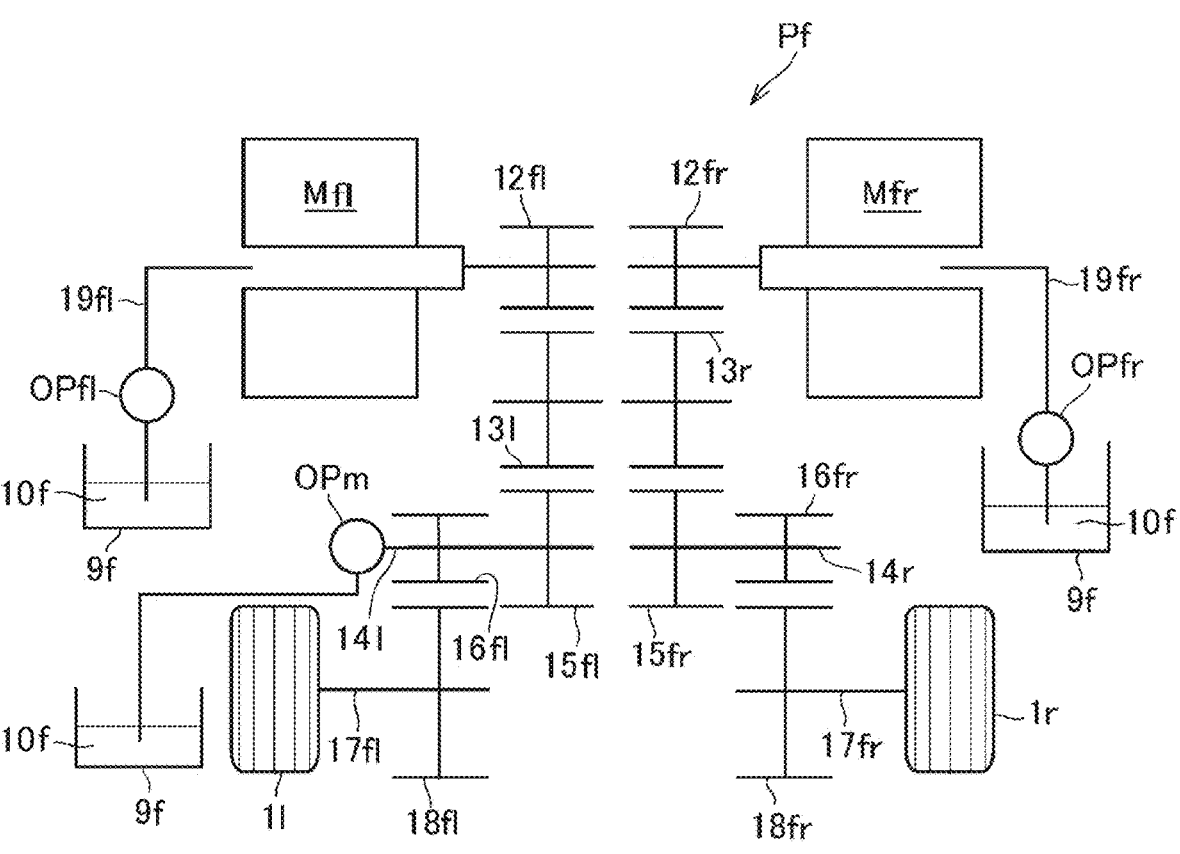
FIG. 3 is a skeleton diagram illustrating an example of the drive unit on the front wheel side.

FIG. 3 is a skeleton diagram illustrating an exemplary driving device Pf on the front wheels 1r, 1l. Since the driving device Pf has a bilaterally symmetrical configuration, it will be described collectively without particular reference to "right" and "left". Driving motors Mfr, Mfl are mounted with its rotational center axis oriented in the lateral direction of the vehicle Ve, and drive gears 12fr, 12fl are attached to the rotor axis, and the drive gears 12fr, 12fl mesh with the idle gears 13r, 13l. Counter shafts 14r, 14l are provided parallel to the rotational center axis of the idle gears 13r, 13l, and the idle gears 13r, 13l mesh with counter driven gears 15fr, 15fl mounted on the counter shafts 14r, 14l. Since the counter driven gears 15fr, 15fl are larger in diameter than the drive gears 12fr, 12fl attached to the motors Mfr, Mrl, the gear pairs each constitute a reduction gear. Counter drive gears 16fr, 16fl are attached to the counter shafts 14r, 14l, and the counter drive gears 16fr, 16fl mesh with driven gears 18fr, 18fl integral with drive shafts 17fr, 17fl connected to the front wheels 1r, 1l. Since the driven gears 18fr, 18fl are larger in diameter than the counter drive gears 16fr, 16fl, the gear pairs each constitute a reduction gear.

The motors Mfr, Mfl on the front wheels 1r, 1l side are configured to be cooled by an oil 10f similarly to the motors Mrr, Mrl on the rear wheels 2r, 2l side. That is, electric oil pumps OPfr, OPfl are provided corresponding to the motors Mfr, Mfl on the front wheels 1r, 1l, and these oil pumps OPfr, OPfl are configured to draw oil 10f from the oil reservoir 9f and supply oil 10f to the motors Mfr, Mfl via the coolant passages 19fr, 19fl. Although not particularly illustrated, the oil cooled by the motors Mfr, Mfl is configured to return to the oil reservoir 9r. In addition, an oil cooler may be provided in the middle of the coolant passages 19fr, 19fl. Note that the oil pumps on the front wheels 1r, 1l side may be a single oil pump that collectively supplies oil 10f to the right and left motors Mfr, Mfl in the same manner as the oil pumps on the rear wheels 2r, 2l side described above.

An oil pump OPm is provided for pumping oil for lubrication. The oil pump OPm is a mechanical pump, and is connected to a countershaft 14l on the left front wheel 1l in the embodiment shown in FIG. 3. Therefore, the oil pump OPm is driven when the vehicle Ve is traveling, and is configured to draw oil 10f from the oil reservoir 9f and supply oil 10f to a predetermined lubricating portion such as a gear and a bearing.

A power storage device (Bat) 20 is provided that transmits and receives electric power to and from the motors Mfr, Mfl, Mrr, Mrl and the oil pumps OPfr, OPfl, OPrr, OPrl (see FIG. 1). The power storage device 20 mainly includes a secondary battery such as a lithium-ion battery or an all-solid-state battery. The motors Mfr, Mfl, Mrr, Mrl are, for example, permanent magnet-type synchronous electric motors, and these motors Mfr, Mfl, Mrr, Mrl are connected to the power storage device 20 via power controllers PCf, PCr mainly composed of inverters. Therefore, the motors Mfr, Mfl, Mrr, Mrl individually control the outputting torque and the braking torque at the time of energy regeneration independently of each other. Note that the power controllers PCf, PCr may be configured as an integral unit as a whole, as long as the functions thereof are independent of each other.

Figure 4:
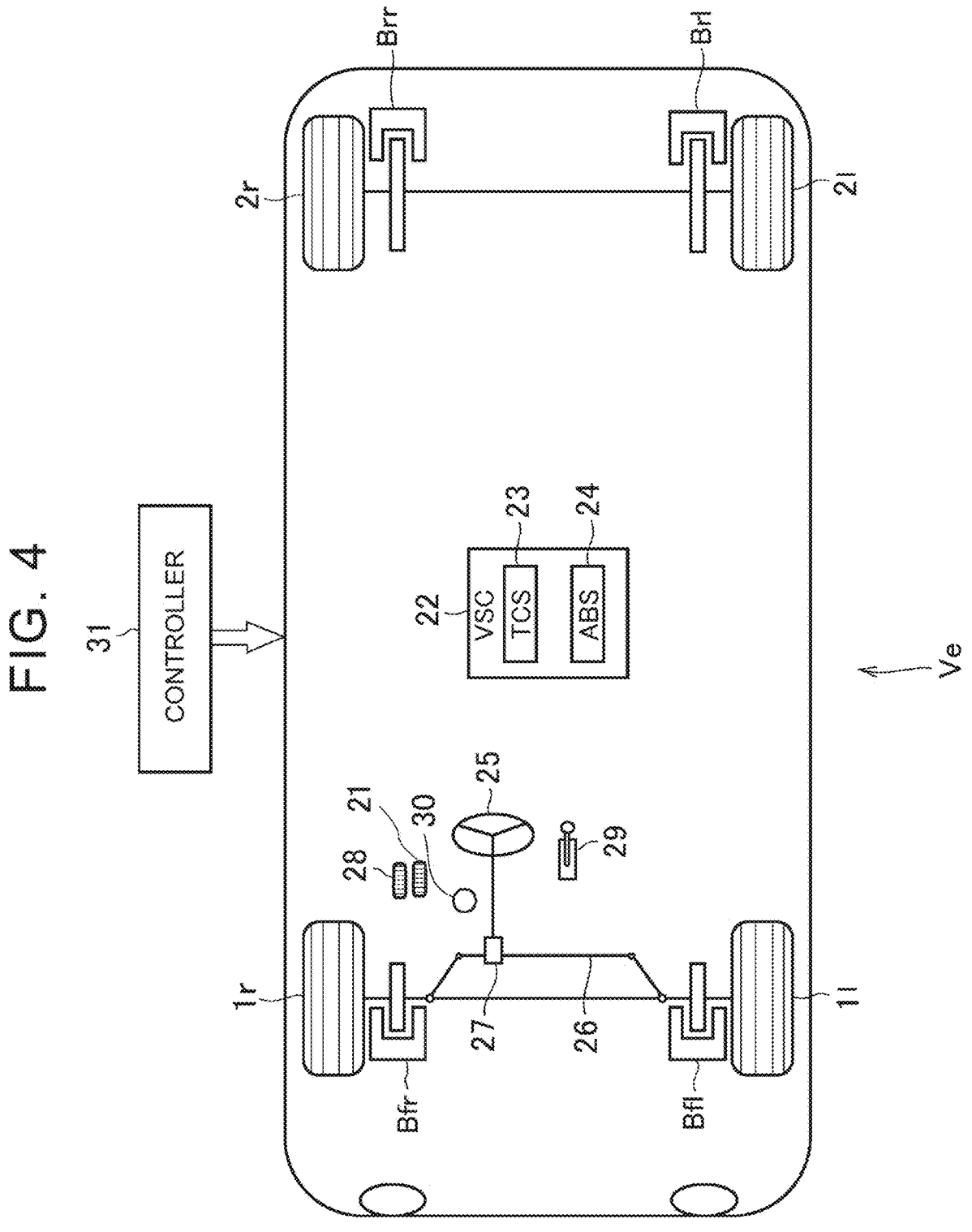
FIG. 4 is a schematic diagram for explaining various mechanisms for stopping and turning a vehicle.

The vehicle Ve is equipped with various mechanisms for running and stopping and turning, similar to conventional vehicles. The main configuration is schematically illustrated in FIG. 4. The wheels 1r, 1l, 2r, 2l are provided with braking mechanisms Bfr, Bfl, Brr, Brl. In addition to generating a braking force by operating the brake pedal 21, the brake mechanisms Bfr, Bfl, Brr, Brl are configured to be electrically controlled to generate a braking force. A vehicle stability control (VSC) 22 is provided to electrically control the braking force. VSC 22 may have a configuration similar to that of the conventionally known configuration, for example, VSC 22 is a system integrating a traction control system that operates the brake mechanisms Bfr, Bfl, Brr, Brl so as to limit the driving force of each wheel (TCS) 23 or an anti-lock brake system (ABS) 24 that reduces or releases the braking force of the brake mechanisms Bfr, Bfl, Brr, Brl so as to avoid locking of each wheel. Therefore, when the control by VSC 22 is executed, the acceleration/deceleration occurs in the vehicle Ve.

In the vehicle Ve shown in FIG. 4, the front wheels 1r, 1l are steered wheels, and a power steering mechanism (PS or EPS) including a steering wheel 25, a steering linkage 26, an actuator 27 for assisting a steering force, and the like is provided.

Further, the vehicle Ve is provided with an accelerator pedal 28 for performing an acceleration/deceleration operation, a shift device 29 for selecting a shift stage or a travel range, a mode selection switch 30 for selecting a travel mode, and the like. The shift device 29 and the mode selection switch 30 may be configured to select a shift stage (gear ratio) by a lever provided on a floor, a center console, or the like, or to select a shift range, or may be configured to switch a shift stage one by performing an up operation or a down operation in a manual position, or may be configured to sequentially switch a shift range by operating a button switch provided on an instrument panel, a steering wheel, a steering column, or the like, or to switch a shift stage (gear ratio) one by one.

The driving mode is mainly a control mode in which the driving torque is controlled based on a predetermined criterion, and includes a normal mode in which the acceleration performance and the energy efficiency (the electric power cost) are standard values, an economy mode in which the electric power cost is controlled in preference to the acceleration, a manual sport mode in which the acceleration performance or the power performance is enhanced, a track mode in which the turning performance is enhanced, a drift mode in which the driving accuracy is further improved, and the like. These driving modes are selected by operating the shift device 29 and the mode selection switch 30. In addition, the driving modes other than the normal mode and the economy mode are generally selected by the driver for a larger driving force or a larger braking force, and thus a four-wheel driving condition in which the front and rear wheels 1r, 1l, 2r, 2l are used as the driving wheels is set. Even in the normal mode, a four-wheel drive state may be set when a sudden acceleration operation or a sudden deceleration operation is performed.

Various operating states or driving required states including the vehicle speed of the vehicle Ve are detected by a sensor. Examples of the sensor include, but are not limited to, a vehicle speed sensor, an accelerator operation amount sensor, an oil temperature sensor, a steering angle sensor, a shift position sensor, a brake sensor, a travel mode sensor, a motor rotation speed sensor, a motor temperature sensor, and the like.

The controller 31 is provided to control the driving torque, the rotational speed, or the regenerative torque of the motors Mfr, Mfl, Mrr, Mrl, the rotational speeds of the electric oil pumps OPfr, OPfl, OPrr, OPrl, or the discharge amounts of the oil pumps OPfr, OPfl, OPrr, OPrl based on the operating state, the driving required state, and the like detected by the sensors. The controller 31 mainly includes a microcomputer including an arithmetic element (CPU), a storage element (RAM, ROM), an interface, and the like, and is configured to perform an arithmetic operation according to a predetermined program using input data and data stored in advance, and to output the result of the arithmetic operation to the power controllers PCf, PCr and the like described above as a control command signal.

Figure 5:
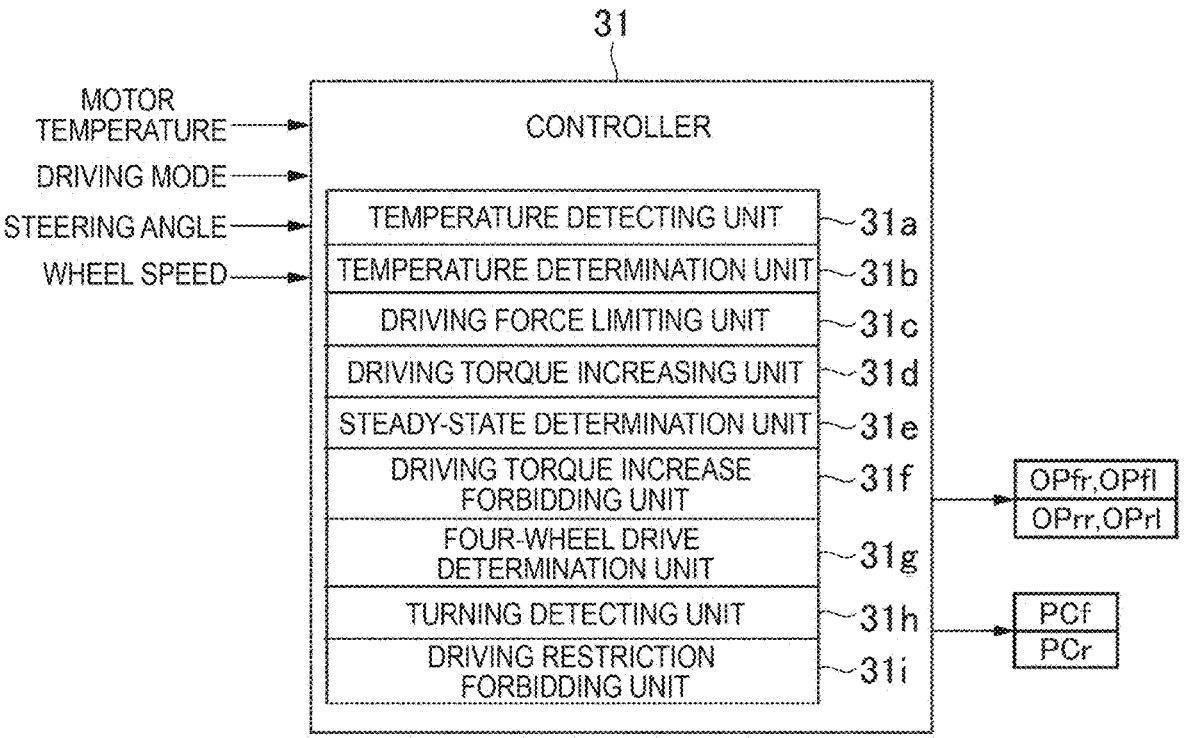
FIG. 5 is a block-diagram illustrating the functional configuration and input-signal of the controllers.

In particular, the controller 31 is configured to control the distribution of the driving torque so as to maintain the driving performance or the running stability of the vehicle Ve when the driving torque of either the right or left motor Mfr, Mfl in the driving device Pf on the front wheels 1r, 1l side or the driving torques of the motors Mrr, Mrl in the driving device Pr on the rear wheels 2r, 2l side is limited by the thermal influence. Specifically, if the drive torque of the left motor Mfl (or Mrl) or the right motor Mfr (or Mrr) is too high or too low, the drive torque of the other motors paired with the motor Mfl (or Mrl, or Mfr or Mrr) in the left-right direction (vehicle width direction) of the vehicle Ve is reduced. Therefore, when the temperature is excessively high, for example, the increase in the temperature is prevented or suppressed by reducing the driving torque instead of promoting the cooling by increasing the amount of the oil 10f, 10r. The resulting reduction in the overall drive torque of the vehicle Ve is compensated for by increasing the drive torque by the other driving device Pr (or Pl). When such control is performed, there is a possibility that the driving torque of the front, rear, left, and right wheels changes significantly and the steering characteristic or the turning characteristic is affected, and therefore, the control of the driving torque or the torque distribution is appropriately executed or prohibited according to the turning state of the vehicle Ve. The controller 31 comprises the functional arrangement (or functional means) illustrated in FIG. 5 for performing such control.

The controller 31 includes a temperature detecting unit 31a that detects the temperatures of the motors Mfr, Mfl, Mrr, Mrl. The temperature can be detected based on data obtained by a temperature sensor (not shown) provided for each motor Mfr, Mfl, Mrr, Mrl, or can be detected based on data obtained by an oil temperature sensor. A temperature determination unit 31b that determines whether the detected temperature falls within a predetermined temperature range is provided in the controller 31. The temperature range in which the motors Mfr, Mfl, Mrr, Mrl output the drive torque as designed is determined as a specification, and when the motor is operated at a temperature exceeding the upper limit temperature, the desired drive torque cannot be output, damages such as seizure occur, and the durability deteriorates. In addition, when operating under the lower limit temperature, abnormality or damage occurs including related parts such as bearings, and durability deteriorates. Therefore, the temperature range of the motors Mfr, Mfl, Mrr, Mrl is determined in advance so as to operate normally or as expected. The temperature range may not conform to the specifications of the motors Mfr, Mfl, Mrr, Mrl, and may be a temperature range determined by adding a predetermined margin to the upper and lower limit temperature or the upper and lower limit temperature defined as the specifications. Furthermore, depending on the circumstances in which the vehicle Ve is expected to be used, it may be a temperature range that defines only the upper limit temperature.

When the temperature of one of the right and left motors Mfr, Mrr (or Mfl, Mrl) is out of the predetermined temperature range, the controller 31 is provided with a driving force limiting unit 31c that reduces the driving torque of the other motor which is a pair in the left-right direction (vehicle width direction) of the motor and the vehicle Ve which is outside the temperature range and whose temperature falls within the above temperature range. This control is a control for making the balance of the left and right drive torques or the torque distribution ratio suitable for the running state at that time, and when the drive torque of one of the motors is limited on the left and right sides, the drive torque of the other motor is lowered so as to match the limited drive torque. Therefore, the torque of the other motor to be reduced may be a torque corresponding to the torque of one of the motors to be limited, and in a case where the torque of one of the motors is reduced so as to avoid a thermal effect, the driving torque of the other motor may be reduced in accordance with the reduced driving torque. In this case, the torque of the left and right motors paired with each other is maintained at a predetermined torque without being set to zero even if the driving torque of one of the motors is restricted by a thermal influence. This is to maintain the four-wheel drive state.

The controller 31 includes a driving torque increasing unit 31*d*. As described above, when the driving torque is limited by the temperature being outside the predetermined temperature range, the driving torque in the front-side or rear-side driving device Pf, Pr including the motor that is outside the temperature range is reduced, and therefore, the driving torque of the other driving device Pr, Pf is increased so as to compensate for the decrease in the driving torque, and the driving torque as a whole of the vehicle Ve is maintained in order to maintain the driving performance or the running stability of the vehicle Ve. The driving torque increasing unit 31*d* performs an increase control of the drive torque for this purpose.

If the driving torque of any of the motors is increased, the temperature of the motor inevitably increases. Therefore, in the control for increasing the drive torque by the driving torque increasing unit 31*d*, it is preferable that the temperatures of the driving devices Pr, Pf that execute the control fall within a predetermined steady range. Here, the steady range is a range of temperatures at which the motor can be operated without any trouble, and may be the same as the above-described predetermined temperature range, or may be a range set separately from the predetermined temperature range. The temperatures of the driving devices Pr, Pf (in particular, the motor thereof) can be detected by the temperature detecting unit 31*a* described above, and a steady-state determination unit 31*c* for determining that the temperature falls within the steady state is provided in the controller 31. In addition, the controller 31 is provided with a driving torque increase forbidding unit 31*f* that prohibits the above-described drive torque increase control when the temperatures of the driving devices Pr, Pf are not in the steady-state range.

In the above-described control of changing the driving torque by the temperature of any of the motors being a so-called abnormality, the driving torque of either one of the front wheels 1*r*, 1*l* side and the rear wheels 2*r*, 2*l* side having a so-called abnormality in terms of temperature is reduced, and the driving torque of the other is increased. Therefore, such control of the driving torque is executed in a four-wheel driving state in which the four wheels of the front and rear are driven. Therefore, the controller 31 is provided with a four-wheel drive determination unit 31*g* for determining the preconditions for executing the control. Since the traveling state in which the four-wheel driving state is maintained can be determined based on the traveling mode, the four-wheel driving state can be determined not only based on the outputting states of the control signals to the motors Mfr, Mfl, Mrr, Mrl, but also based on the selected traveling mode.

Since the turning performance and the steering characteristics change according to the magnitude of the driving torque of the left and right wheels, there is a possibility that the turning performance, the steering stability, and the like are affected when the driving torque of the left and right wheels is controlled. Therefore, the controller 31 is provided with a turning detecting unit 31*h* that detects that the vehicle Ve is turning. Further, it is preferable to avoid or suppress a change in the turning performance or the traveling condition due to a change in the driving torque of the left and right wheels, and when the turning travel is detected there, a driving restriction forbidding unit 31*i* for prohibiting the control of reducing the driving torque of the other motor by the driving force limiting unit 31*c* is provided in the controller 31.

Various types of data are input to the controller 31 as data for performing the above-described control, and an example of the input signal is as follows. A motor temperature obtained by a temperature sensor or an oil temperature sensor of each motor Mfr, Mfl, Mrr, Mrl, a travel mode for determining a four-wheel drive state, a steering angle for determining a turning travel, a rotational speed of each wheel obtained by a wheel speed sensor, and the like are inputted to the controller 31. Further, as an example of the data stored in advance in the controller 31, the temperature range for determining that the detected temperature is excessively high or excessively low, when the temperature of any of the motors is outside the predetermined temperature range, the driving torque reduction width for reducing the driving torque of the other motors as a pair or the distribution ratio of the driving torque of the left and right, the driving torque increase amount for increasing the driving torque of the driving device including the motor which is not out of the above temperature range or the drive torque distribution ratio of the front and rear, the steady range for the temperature of the driving device for increasing the driving torque, and the like are stored in advance in the controller 31.

Figure 6:
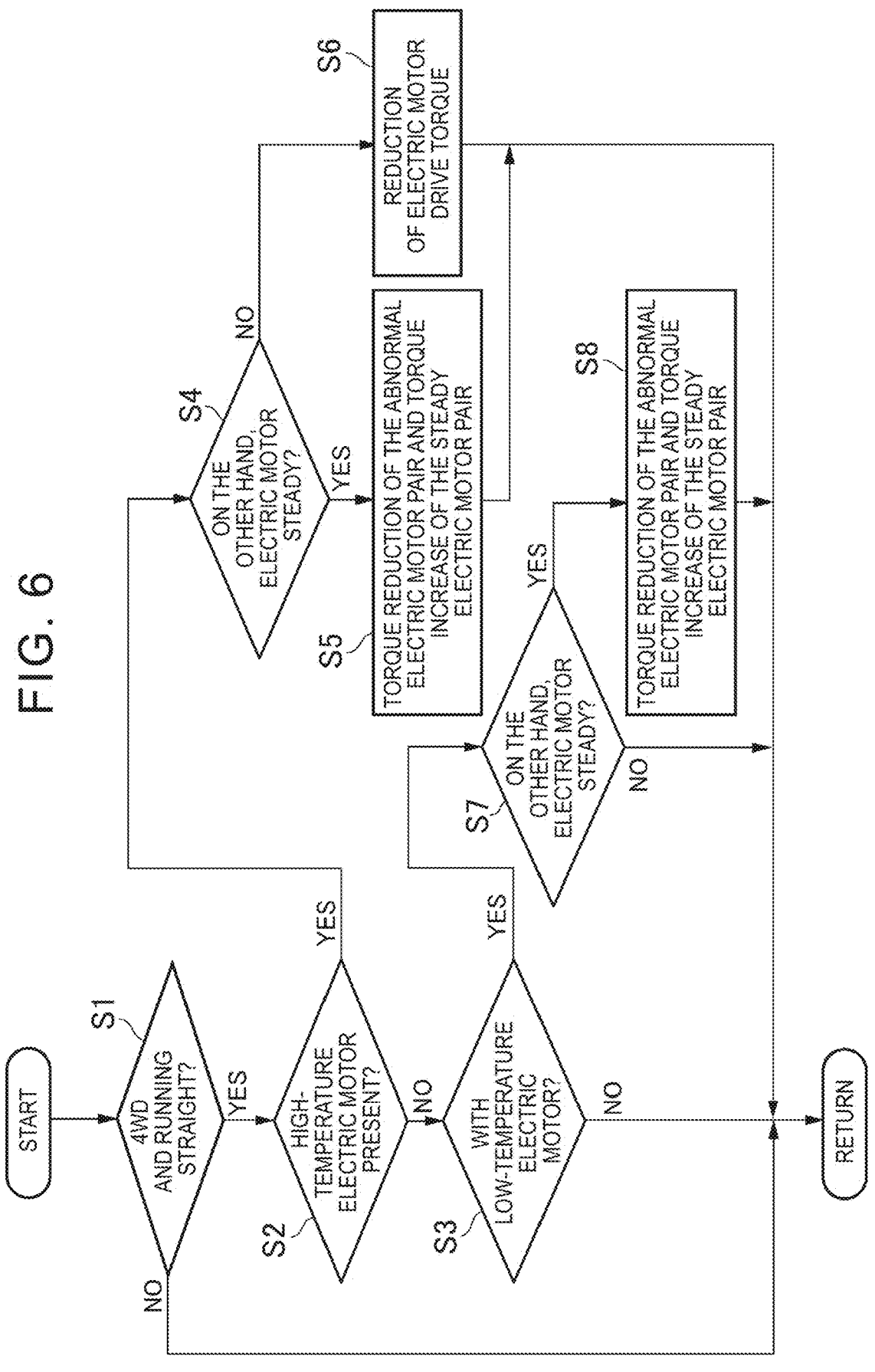
FIG. 6 is a flowchart for explaining an example of control executed in the embodiment of the present disclosure.

An example of the control executed by the controller 31 is shown in a flowchart in FIG. 6. The routine illustrated in FIG. 6 is repeatedly executed by the controller 31 at predetermined short time intervals when the vehicle Ve is traveling. First, it is determined whether or not the vehicle Ve is traveling straight in a four-wheel driving condition (4WD) for driving four wheels (S1). If the determination of S1 is "no" due to neither of the four-wheel drive nor the straight travel, the vehicle returns without any particular control. That is, the routine shown in FIG. 6 is temporarily ended. The function of determining S1 is the function of the four-wheel drive determination unit 31*g* and the turning detecting unit 31*h* described above. In addition, when the determination result of S1 becomes "no" due to the turning travel of the vehicle Ve, since the control of the drive torque is not performed by bypassing the steps of controlling the drive torque to be described later, the function of avoiding the control of the drive torque corresponds to the function of the driving restriction forbidding unit 31*i* described above.

On the contrary, when the driving condition of the vehicle Ve is four-wheel driving and the vehicle Ve travels straight, the determination result of S1 is "yes", it is determined whether or not there is a motor Mfr, Mfl, Mrr, Mrl having a temperature exceeding a predetermined temperature range. In the embodiment shown in FIG. 6, it is determined whether or not there is a motor whose motor temperature is outside the predetermined temperature range to the high temperature side, that is, a so-called high-temperature electric motor (high-temperature motor) which is equal to or higher than the upper limit temperature of the temperature range (S2). When the determination result of S2 is "no" due to an excessively high-temperature motor not being detected, it is determined whether or not there is a motor whose motor temperature is outside the predetermined temperature range to the low temperature side, that is, a so-called low-temperature electric motor (low-temperature motor) which is lower than or equal to the lower limit temperature of the temperature range (S3). The function of determining S2 and the function of determining S3 correspond to the functions of the temperature detecting unit 31*a* and the temperature determination unit 31*b* described above. If both S2 and S3 are judged to be "No", the motors Mfr, Mfl, Mrr, Mrl of all four wheels can be operated normally, so that the vehicle returns without any particular control.

On the contrary, if the determination of either S2 or S3 is "yes", the power control is performed on the motors Mfr, Mfl, Mrr, Mrl. First, when the determination of S2 is "yes"

due to the detection of a motor whose temperature is out of the predetermined temperature range to the high temperature side, it is determined whether the other motor is stationary (S4). Here, the "other motors" are motors Mrr, Mrl on the rear wheels 2r, 2l side when so-called temperature abnormal motors with an excessively high-temperature are motors Mfr, Mfl on the front wheels 1r, 1l side, and are motors Mfr, Mfl on the front wheels 1r, 1l side when so-called temperature abnormal motors with an excessively high-temperature are motors Mrr, Mrl on the rear wheels 2r, 2l side. In addition, "steady state" means that no abnormality is detected including the temperature. Therefore, the function of determining S4 corresponds to the function of the steady-state determination unit 31e described above.

If the outcome of this S4 determination is "yes", then the torque of the other motor can be increased. Therefore, the torque of the pair of left and right motors including the motor having an abnormal temperature is reduced, and the torque of the pair of other left and right motors for which steady determination is made is increased (S5), and then the motor returns. The control of this S5 is described in FIG. 6 as "torque reduction of the abnormal electric motor pair and torque increase of the steady electric motor pair".

Specifically, when the motor Mfr (or Mfl) on one of the front wheels 1r, 1l is at a high temperature, this control lowers the torque of the other motor Mfl (or Mfr) that is paired with the motor Mfr (or Mfl) in the left-right direction. The torque control may be a control to adjust the torque of the other motor Mfl (or Mfr) to the torque of one motor Mfr (or Mfl) whose power is limited in terms of temperature, or may be a control to reduce the torque of both the right and left motors Mfr, Mfl together so as to balance each other. Similarly, if one of the motor Mrr (or Mrl) on either side of the rear wheels 2r, 2l is at a high temperature, the motor Mrr (or Mrl) and the other motor Mrl (or Mrr) paired in the left-right direction are torqued. The torque control may be a control to adjust the torque of the other motor Mrl (or Mrr) to the torque of one motor Mrr (or Mrl) whose power is limited in terms of temperature, or may be a control to reduce the torque of both the right and left motors Mrr, Mrl together so as to balance each other. Further, the control of the "torque increase of the steady electric motor pair" is a control for increasing the torque of the pair of motors Mfr, Mfl (or Mrr, Mrl) of either one of the front and rear, when the torque of the pair of motors is reduced, the torque of the pair of motors Mrr, Mrl (or Mfr, Mfl) of the other one of the front and rear. The increase amount may be an amount corresponding to a decrease amount of torque of one of the pair of motors Mfr, Mfl (or Mrr, Mrl). This is to maintain the driving torque of the entire vehicle Ve.

As described above, in S5, since the torque of the other motor paired in the left-right direction with the so-called abnormal motor in terms of temperature is reduced, and the drive torque of the other pair of motors separated from the pair of motors reduced in the drive torque in the front-rear direction of the vehicle Ve is increased, the control or the function performed by S5 corresponds to the function of the driving force limiting unit 31c and the function of the driving torque increasing unit 31d described above. When the determination result of the above-described S4 is "no", the control of the above-described S5 is avoided, and therefore, the function of avoiding the control of this S5 corresponds to the function of the above-described driving torque increase forbidding unit 31f.

On the other hand, when the determination of S4 described above is "no", the driving torque of the motor is reduced (S6), and then the motor is returned. Here, the motor for reducing the driving torque is a motor whose temperature exceeds a predetermined upper limit temperature, and therefore, the driving torque of the other motors paired with the motor in the left-right direction is also reduced in order to balance the left-right driving torque.

By performing the control of the reduction and the increase of the driving torque in the above-described S5, it is possible to suppress the heat generation of the motor having an excessively high temperature and reduce the temperature thereof. There is no particular need to increase the feed rate of the oil 10f, 10r fed by the oil pumps OPfr, OPfl, OPrr, OPrl described above. Therefore, it is possible to avoid the necessity of increasing the size of the mechanisms for cooling the motors Mfr, Mfl, Mrr, Mrl in particular, and it is possible to avoid or suppress damages to the motors Mfr, Mfl, Mrr, Mrl and deterioration in durability. Further, even if the driving torque is reduced in either the front or the rear of the vehicle Ve, the reduction in the torque is compensated by the other driving torque in either the front or the rear, so that it is possible to maintain the driving performance or the power performance of the vehicle Ve in a good condition.

The above-described control of the reduction or limitation of the driving torque and the increase is performed in the same manner even when a motor having a temperature lower than a predetermined temperature range is detected (present). That is, if the determination at S3 is "yes" because the temperature of any of the motors is lower than the lower limit temperature that determines the predetermined temperature range, it is determined whether or not the other motor is steady (S7). The control of this S7 is similar to the control of S4 described above, and therefore, the "other motors" are motors Mrr, Mrl on the rear wheels 2r, 2l side when the so-called temperature abnormal motors with an excessively low temperature are three motors Mfr, Mfl on the front wheels 1r, 1l side, and are motors Mfr, Mfl on the front wheels 1r, 1l side when the so-called temperature abnormal motors with an excessively low temperature are motors Mrr, Mrl on the rear wheels 2r, 2l side. In addition, "steady state" means that no abnormality is detected including the temperature. Therefore, the function of determining S7 corresponds to the function of the steady-state determination unit 31e described above.

If the outcome of this S7 determination is "yes", then the torque of the other motor can be increased. Therefore, the torque of the pair of left and right motors including the motor having an abnormal temperature is reduced, and the torque of the pair of other left and right motors for which steady determination is made is increased (S8), and then the motor returns. The control in this S8 is the same as the control in S5 described above, and this is described as "torque reduction of the abnormal electric motor pair and torque increase of the steady electric motor pair" in FIG. 6. Further, the details of the specific control in this S8 are the same as those in the above-described S5. The reason why the above-described drive torque is controlled even when the temperature is low is that there is a possibility that components such as a motor and a bearing related thereto and a lubricating oil and the like do not operate normally, and if a large drive torque is output in this state, there is a concern that some damage may occur. In other words, such damage and deterioration in durability can be avoided or suppressed.

Note that the present disclosure is not limited to the above-described embodiment, and the present disclosure can also be applied to a vehicle in which the left and right wheels on which a driving motor is individually provided may be any two wheels of a front wheel and a rear wheel, and the other two wheels are configured to be driven by a single driving force source. Further, in the present disclosure, the predetermined temperature range is a range defined only by the upper limit temperature, when the temperature of any of the motors exceeds the upper limit temperature, the control of the reduction and increase of the drive torque described above may be performed.

What is claimed is:

1. An independent right-left wheel driving vehicle including a first driving device configured to drive right and left front wheels, and a second driving device configured to drive right and left rear wheels, in which at least one of the first driving device or the second driving device includes a left electric motor that drives a left wheel and a right electric motor that drives a right wheel making up a pair with the left wheel, the independent right-left wheel driving vehicle comprising:

a temperatures sensor configured to detect a left electric motor temperature of the left electric motor and a right electric motor temperature of the right electric motor;

a processor; and a memory storing executable instructions that cause the processor to acquire the left electric motor temperature and the right electric motor temperature from the temperature sensor, determine whether either of the left electric motor temperature or the right electric motor temperature falls outside a predetermined temperature range, reduce driving torque of the other electric of the left electric motor temperature or the right electric motor for which the detected temperature does not fall outside the predetermined temperature range in response to determining that temperature of either of the left electric motor or the right electric motor falls outside the predetermined temperature range, and increase driving torque of the other driving device of the first driving device or the second driving device that does not include the one electric motor having the temperature outside the temperature range, from among the first driving device and the second driving device in response to the driving torque of the other electric motor being reduced, wherein the left electric motor and the right electric motor of the at least one of the first driving device or the second driving device are mounted such that rotational center axes of both the left electric motor and the right electric motor extend in a direction parallel to the longitudinal direction of the independent right-left wheel driving vehicle.

2. The independent right-left wheel driving vehicle according to claim 1, wherein:

the other driving device of the first driving device or the second driving device includes a traction electric motor as a driving force source, and the executable instructions further cause the processor to acquire a traction electric motor temperature of the traction electric motor;

determine whether the traction electric motor temperature falls within a predetermined steady-state range; and prohibit increasing the driving torque in response to determining that the traction electric motor temperature does not fall within the predetermined steady-state range.

3. The independent right-left wheel driving vehicle according to claim 1, wherein the executable instructions further cause the processor to determine four-wheel drive traveling in which the first driving device and the second driving device output drive torque to perform traveling;

reduce driving torque of the other electric motor when the four-wheel drive traveling is determined to be performed; and increase driving torque of the other driving device when the four-wheel drive traveling is determined to be performed.

4. The independent right-left wheel driving vehicle according to claim 1, wherein the executable instructions further cause the processor to determine whether the vehicle is performing a turn, and prohibit reduction of driving torque at the other electric motor in response to determining that the vehicle is performing a turn.

5. The independent right-left wheel driving vehicle according to claim 1, wherein the predetermined temperature range is one of either a range in which only an upper-limit temperature is set, or a range in which the upper limit temperature and a lower-limit temperature are both set.

6. The independent right-left wheel driving vehicle according to claim 1, wherein the driving device of the at least one of the first driving device or the second driving device including the left electric motor and the right electric motor further comprises a casing that accommodates the left electric motor and the right electric motor in a liquid-tight manner.

7. The independent right-left wheel driving vehicle according to claim 6, further comprising:

at least one oil pump provided outside the casing, wherein the at least one oil pump is configured to supply oil to the left electric motor and the right electric motor to cool and lubricate the left electric motor and the right electric motor.

8. The independent right-left wheel driving vehicle according to claim 7, wherein the at least one oil pump is an electric oil pump.

9. The independent right-left wheel driving vehicle according to claim 1, wherein the temperature sensor is a plurality of temperature sensors provided at each of the left electric motor and the right electric motor.

10. The independent right-left wheel driving vehicle according to claim 1, wherein the temperature sensor is a plurality of temperature sensors provided for each of the left electric motor and the right electric motor, and the plurality of sensors being configured to detect an oil temperature of oil that is returned to an oil reservoir from each of the left electric motor and the right electric motor.

*    *    *    *    *